(12) United States Patent
Schmidt

(10) Patent No.: US 6,216,847 B1
(45) Date of Patent: Apr. 17, 2001

(54) CONVEYOR LIFT AND DIVERT DEVICE WITH MINIMUM OVERALL HEIGHT

(75) Inventor: Heinz Schmidt, Stuttgart (DE)

(73) Assignee: Mannesmann Aktiengesellschaft, Duesseldorf (DE)

( * ) Notice: Subject to any disclaimer, the term of this patent is extended or adjusted under 35 U.S.C. 154(b) by 0 days.

(21) Appl. No.: 09/294,556

(22) Filed: Apr. 20, 1999

(30) Foreign Application Priority Data

Apr. 20, 1998 (DE) .............................. 198 18 604

(51) Int. Cl.[7] .................................... B65G 47/54

(52) U.S. Cl. .......................................... 198/463.3

(58) Field of Search ................ 198/463.3, 457.03, 198/463.2, 465.1, 369.1, 369.6, 361

(56) References Cited

U.S. PATENT DOCUMENTS

| | | | |
|---|---|---|---|
| 3,841,460 | * 10/1974 | Suter | 198/463.3 |
| 3,921,789 | 11/1975 | Goldinger et al. . | |
| 4,047,625 | * 9/1977 | Grant | 414/651 |
| 4,174,774 | * 11/1979 | Bourgeois | 198/370.1 |
| 4,349,097 | * 9/1982 | Curti | 198/369.5 |
| 4,658,947 | * 4/1987 | Welder | 198/346.2 |
| 4,723,883 | * 2/1988 | Smith | 100/7 |
| 4,747,477 | 5/1988 | Benz et al. . | |
| 4,780,043 | * 10/1988 | Fenner et al. | 414/502 |
| 5,039,270 | * 8/1991 | Parks et al. | 414/286 |

(List continued on next page.)

FOREIGN PATENT DOCUMENTS

| | | |
|---|---|---|
| 2805572 | 8/1979 | (DE) . |
| 3012355 | 10/1981 | (DE) . |
| 3109219 | 7/1982 | (DE) . |
| 4439106 | 5/1996 | (DE) . |

OTHER PUBLICATIONS

EPO search report for European patent application 99250123.0–2308, corresponding to U.S. Patent Application Serial No. 09/294,556.
Copy of Dialog®database printout containing an abstract of DE 3109219 in English.
Copy of Dialog®database printout containing an abstract of DE 3012355 in English.

*Primary Examiner*—Joseph E. Valenza
*Assistant Examiner*—Rashmi Sharma
(74) *Attorney, Agent, or Firm*—Van Dyke, Gardner, Linn & Burkhart, LLP

(57) ABSTRACT

A delivery device for the transfer of mixed-item loads, including workpiece mounts, workpieces, containers or pallets, from a first conveyor line to a second conveyor line comprises at least one conveyor element positioned within the first conveyor line and adjacent the second conveyor line. The conveyor element is operationally attached to at least one linear drive unit which selectively lowers and lifts the conveyor element from a neutral position wherein the conveyor element is positioned below the transport level of the first conveyor line to a delivery position wherein the conveyor element is positioned above the transport level of the first conveyor line to effect transfer of the load to the second conveyor line. Preferably, there are two conveyor elements actuated by a plurality of linear drive units positioned in proximity to the ends of the conveyor elements. A coupler connects each linear drive unit to a conveyor element and includes a guide element extending from the linear drive unit and surrounding the vertically reciprocal drive rod. A pushing element, depending from the connecting frame which supports the conveyor element, is positioned within the guide element and is operationally connected to the drive rod by a ball and socket joint. The guide element maintains the pushing element on the drive rod as the drive rod vertically reciprocates. The end of the pushing element is formed with a conical surface which abuttingly contacts a counterpressure surface formed in the upper region of the guide element to thereby maintain the conveyor element in place when in the delivery position.

12 Claims, 4 Drawing Sheets

U.S. PATENT DOCUMENTS

| | | | |
|---|---|---|---|
| 5,085,310 | * | 2/1992 | Scata et al. ........................ 198/369.3 |
| 5,205,394 | * | 4/1993 | Zeuschner .......................... 198/370.1 |
| 5,305,080 | * | 4/1994 | Lee et al. ............................... 356/237 |
| 5,553,988 | * | 9/1996 | Horn et al. ............................ 414/416 |
| 5,564,264 | | 10/1996 | DeCrane . |
| 5,743,375 | * | 4/1998 | Shyr et al. ......................... 198/463.3 |
| 5,826,699 | * | 10/1998 | Trauten .............................. 198/463.3 |
| 5,984,498 | * | 11/1999 | Lem et al. ............................ 364/131 |
| 6,008,476 | * | 12/1999 | Neiconi et al. ....................... 219/388 |

* cited by examiner

CONVEYOR LIFT AND DIVERT DEVICE WITH MINIMUM OVERALL HEIGHT

BACKGROUND OF THE INVENTION

The invention involves a device for the delivery of mixed-item loads, especially workpiece mounts, workpieces, containers or pallets.

A device for transferring workpieces or workpiece mounts from a first conveyor line to a second conveyor line placed at a right angle thereto is known from German patent document DE 30 12 355 C2. The conveyor lines are each constructed out of two conveyors placed at a distance from each other and in a parallel arrangement. The transfer device consists of an endless transfer belt, guided deflection rollers, which forms a transfer conveyor line between the two conveyors of the first conveyor line. The transfer belt is run by a drive motor, which is integrated with the transfer conveyor line into an assembly unit. The assembly unit is suspended on the supporting frame of the first conveyor line through a connecting frame. The workpiece mounts, or other items, transported on the first conveyor line are lifted by the transfer conveyor line and are laterally transported from the to the second conveyor line. After this, the transfer device is lowered again. The lifting/lowering movement of the transfer device is achieved by a piston/cylinder unit. Additional guidance of the transfer conveyor line with the transfer belt is provided by the fixed connecting frame of the transfer device having two guide rods spaced apart from each other. These spaced guide rods reduce the stress of lateral forces incurred by the piston rod of the piston/cylinder unit. The use of the additional guide rods, in addition to the piston/cylinder unit, increases the construction costs and complexity of the lifting device.

Consequently, there exists a need for a device for the delivery of mixed-item loads, especially workpiece mounts, workpieces, containers or pallets, having a compact construction style, in particular a low overall height, and the ability to dependably deliver mixed-item loads.

SUMMARY OF THE INVENTION

Accordingly, the present invention advances a device for the delivery of mixed item loads, especially workpiece mounts, workpieces, containers or pallets from a first conveyor line to a second conveyor line. Each conveyor line consists of a pair of generally parallel conveyors placed a preselected distance apart. The delivery device of the present invention includes at least one conveyor element located between the conveyors of the first conveyor line and positioned in generally parallel, adjacent relation to a conveyor of the second conveyor line, and a pair of linear drive units positioned at opposing ends of the conveyor element. The linear drive units are operationally connected to the conveyor element by a coupler. The linear drive units selectively move the conveyor element between a neutral position wherein the conveyor element is positioned below the transport level of the first conveyor line to a delivery position wherein the conveyor element is positioned above the transport level.

In a preferred embodiment, there exists two conveyor elements positioned generally parallel and a preselected distance apart. In this embodiment, the delivery device includes at least four linear drive units, each of which is operationally connected to an end of one of the conveyor elements. When so positioned, the linear drive units define the corners of an imaginary parallelogram. Placement of the linear drive units in this arrangement provides stable support for the conveyor elements. Furthermore, positioning the drive elements in proximity to the ends of the conveyor elements reduces the amount of torsional stress incurred by the conveyor elements. Additionally, utilization of a pair of conveyor elements assures dependable delivery of the mixed item load to the second conveyor line. Moreover, by using four linear drive units, the delivery device assumes a smaller, compact construction since the forces incurred by the delivery device are distributed among the plurality of linear drive units.

According to another aspect of the invention, each linear drive unit is attached to a conveyor element by a coupler. Employing a coupler between the drive rod of the linear drive unit and the conveyor elements minimizes the induction of lateral forces into the drive rod. Also, the use of these couplers avoids jamming of the conveyor element which may occur when the linear drive units are actuated in a non-synchronous manner.

In a preferred form, each coupler includes a pushing element depending from the connecting frame which supports the conveying element and depends within a guide element extending from the linear drive unit. Positioned within the guide element is a vertically reciprocal drive rod. The pushing element is connected to the drive rod of the linear drive unit by a ball and socket joint, which transfers force essentially in the vertical direction only. Also, preferably, the end of the pushing element is formed having a conical surface that engages the ball and socket joint, while the top region of the guide element is formed with a counterpressure surface. Consequently, when the drive rod of the linear drive unit is actuated in the vertically upward direction, the drive rod of the linear drive unit will urge the conical surface of the pushing element into abutting contact with the counterpressure surface of the guide element. The abutting contact between the conical surface of the pushing element and the counterpressure surface of the guide element hold the conveyor element stationary in the delivery position, thereby assuring the efficient and dependable transfer of the mixed-item load from the first conveyor line to the second conveyor line. Also, preferably, the pushing element has a cylinder shape oriented lengthwise in the vertical direction, while the conical surface depending from the pushing element is arranged in a ring shape with the conical surface partially surrounding the ball and socket joint.

These and other objects, advantages and features of this invention will become apparent upon review of the following specification in conjunction the drawings.

DESCRIPTION OF THE PREFERRED EMBODIMENTS

Figure 1:
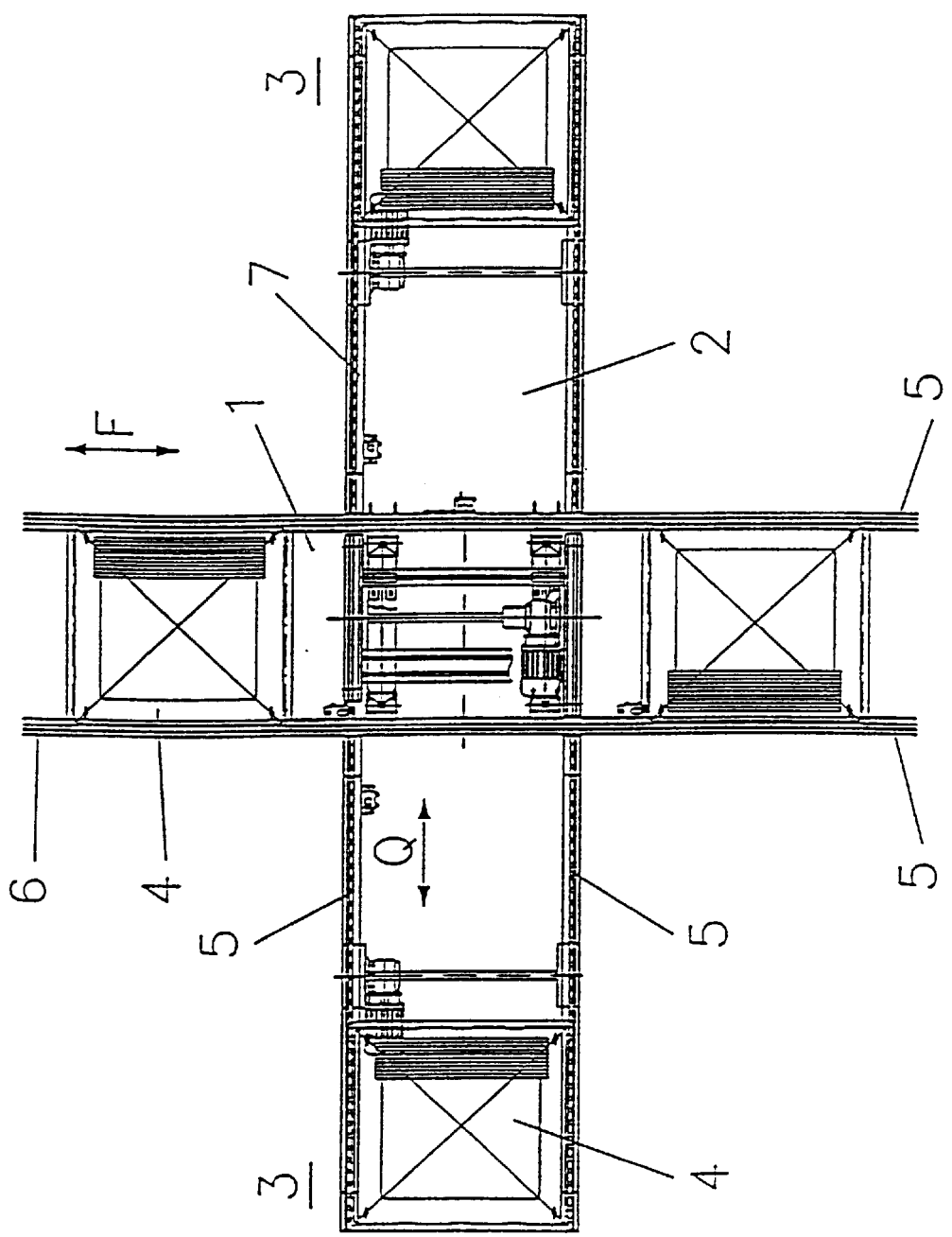
FIG. 1 is a top perspective view of the delivery device according to the present invention shown embodied in a conveyor system having a first conveyor line and a second conveyor line.

Turning now to the Figures and the illustrative embodiments depicted therein, FIG. 1 shows a top view of a conveyor system consisting of a first conveyor line 1, which forms a main conveyor path, and a second conveyor line 2 crossing first conveyor line 1 at a right angle. Assembly work stations 3 are provided on each end of second conveyor line 2, whereupon operating personnel carry out assembly operations on components on second conveyor line 2. Typically, the components are conveyed along the conveyor lines on workpiece mounts. As illustrated in FIG. 1, the workpiece mounts are the load 4 to be conveyed. First conveyor line 1 and second conveyor line 2 are constructed out of two conveyors 5, arranged in parallel and positioned a preselected distance to apart. The conveyors may be of any design normally encountered in the industry. For example, conveyors 5 may be belt conveyors with an endlessly circulating, driven conveyor belt 6 or as chain conveyors with an endlessly circulating roller chain 7. It is also possible to design one of the two conveyors 5 of each conveyor line 1, 2 with a driven belt conveyor or chain conveyor and to provide freely rotatable transport rollers with stationary support on the other conveyor 5.

A delivery device 8, according to the invention, for the delivery of mixed-item loads 4 from first conveyor line 1 to second conveyor line 2 is placed in the crossing area of first conveyor line 1 and second conveyor line 2. Delivery device 8 is also designated a lifting, crosswise transfer unit.

Figure 2:
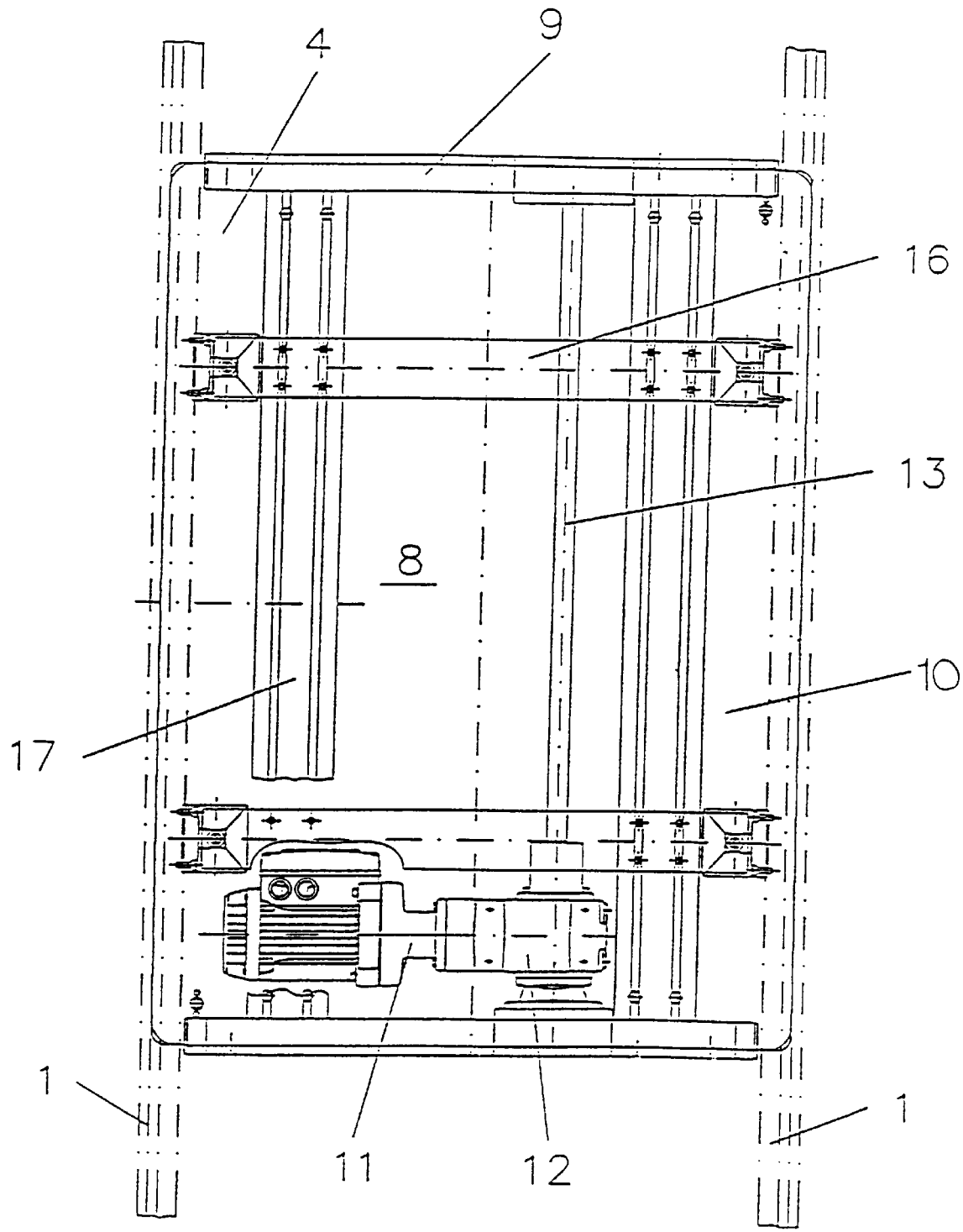
FIG. 2 is a detailed, top perspective view of the delivery device depicted in FIG. 1.

Referring now to FIG. 2, delivery device 8 consists of two conveyor elements 9 positioned generally parallel, and a preselected distance apart. The distance between conveyor elements 9 corresponds generally to the distance between conveyors 5 of first conveyor line 1 and second conveyor line 2. Because of conveyor elements 9, loads 4 designed as workpiece mounts are transported on conveyor lines 1 and 2 along their lengthwise sides. Conveyor elements 9 are oriented between, and at right angles to, conveyors 5 of first conveyor line 1. Conveyor elements 9 are supported on a support frame 10, which has two longitudinal arms 17 running in parallel to the lengthwise direction of first conveyor line 1. Longitudinal arms 17 are connected with each other by two transverse bars 16. Furthermore, conveyor elements 9 are driven by a motor 11 with gear linkage 12. A transmission shaft 13 connected to gear linkage 12 drives conveyor element 9 located remote from motor 11.

Figure 3:
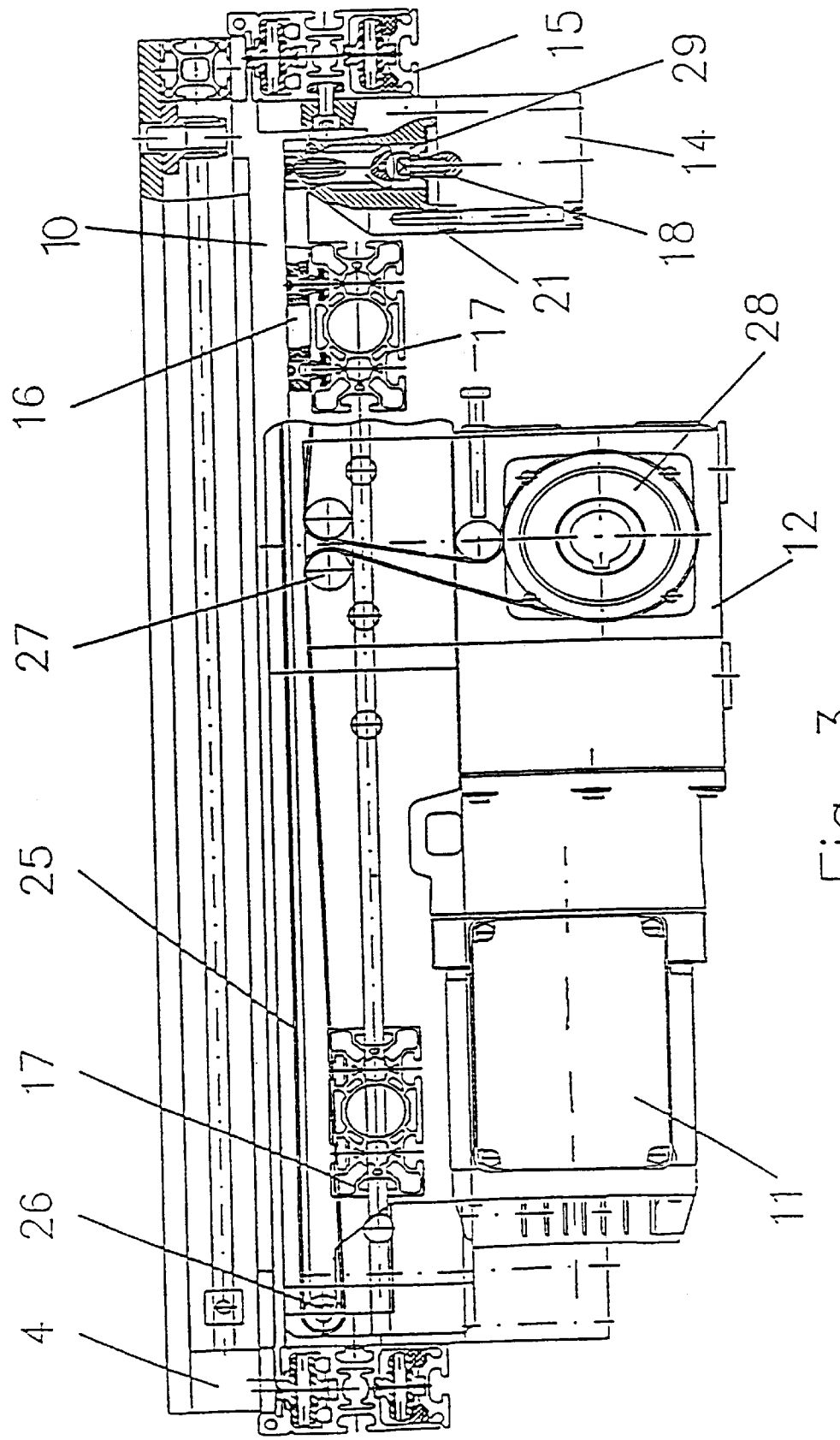
FIG. 3 is a cross-sectional side view of the delivery device depicted in FIG. 2.

Conveyor elements 9 are selectively lifted and lowered by linear drive units 14 designed as pneumatically driven piston/cylinder units from a neutral position, in which the conveyor surface of conveyor elements 9 lies below the conveying, or transport level, of first conveyor line 1, into a delivery position, in which the conveyor elements 9 lie above the transport level of the first conveyor line 1. Four linear drive units 14 are provided for the two conveyor elements 9. The four linear drive units 14 are placed in proximity to the respective ends of conveyor elements 9. As illustrated in FIG. 3, the position of linear drive units 14 define the corners of an imaginary square, and are attached to the inner surfaces of the longitudinal supports 15 of conveyors 5 of first conveyor line 1. Each pair of opposing linear drive units 14 are connected by a cross-wise support 16. Cross-wise supports 16 are attached to longitudinal arms 17. Longitudinal arms 17 are parallel to longitudinal supports 15 of first conveyor line 1. Conveyor elements 9 are supported on each of the opposite ends of the longitudinal supports 15.

Transmission shaft 13 is supported on the inside surface of one conveyor element 9, and the gear linkage 12 is flange-mounted to the inside surface area of the other conveyor element 9. Motor 11, gear linkage 12 and transmission shaft 13 are therefore lifted and lowered together with conveyor elements 9. It is noted in FIGS. 2 and 3, therefore, that conveyor elements 9 are supported through longitudinal arms 17 and cross-wise supports 16 on four linear drive units 14, which are placed in the corner points of an imaginary square.

Each conveyor element 9 consists of an endlessly circulating belt 25, guided by deflection rollers 26 located on the respective ends of conveyor element 9, and further by guide rollers 27, as well as a drive wheel 28 (FIG. 3). Drive wheels 28 are supported on gear linkage 12 or transmission shaft 13. In the raised delivery position, load 4 is lifted by first conveyor line 1 and can be transported away by conveyor elements 9 in the direction of second conveyor line 2 through conveyors 5 of first conveyor line 1.

Figure 5:
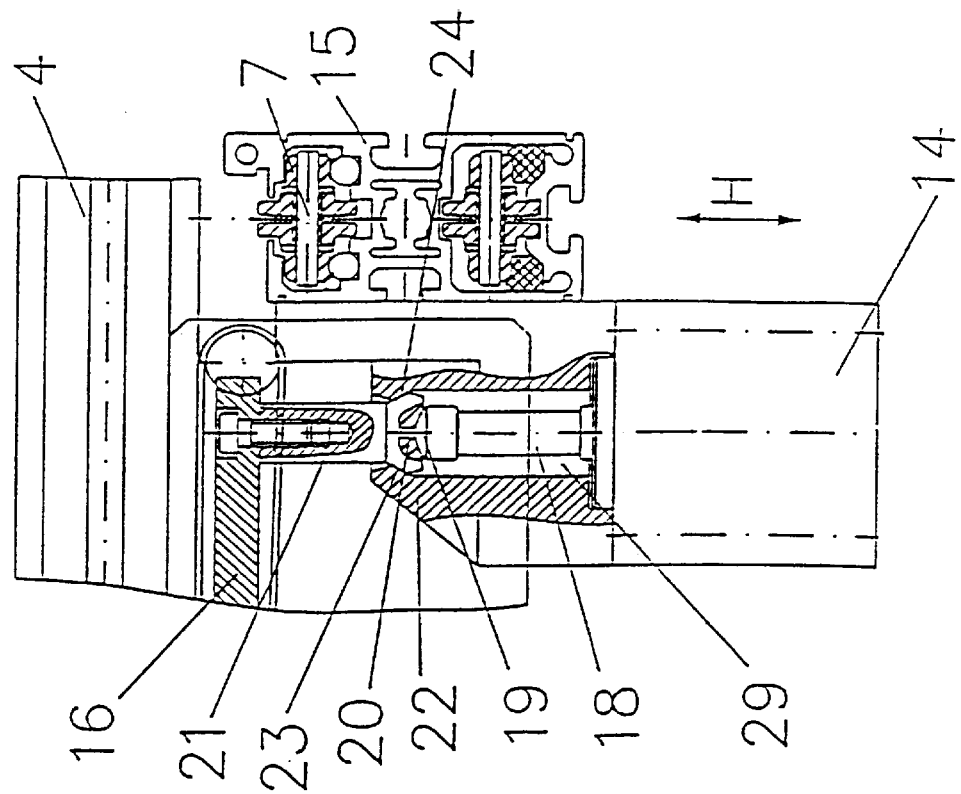
FIG. 5 is the same view as FIG. 4 depicting the delivery position.
Figure 4:
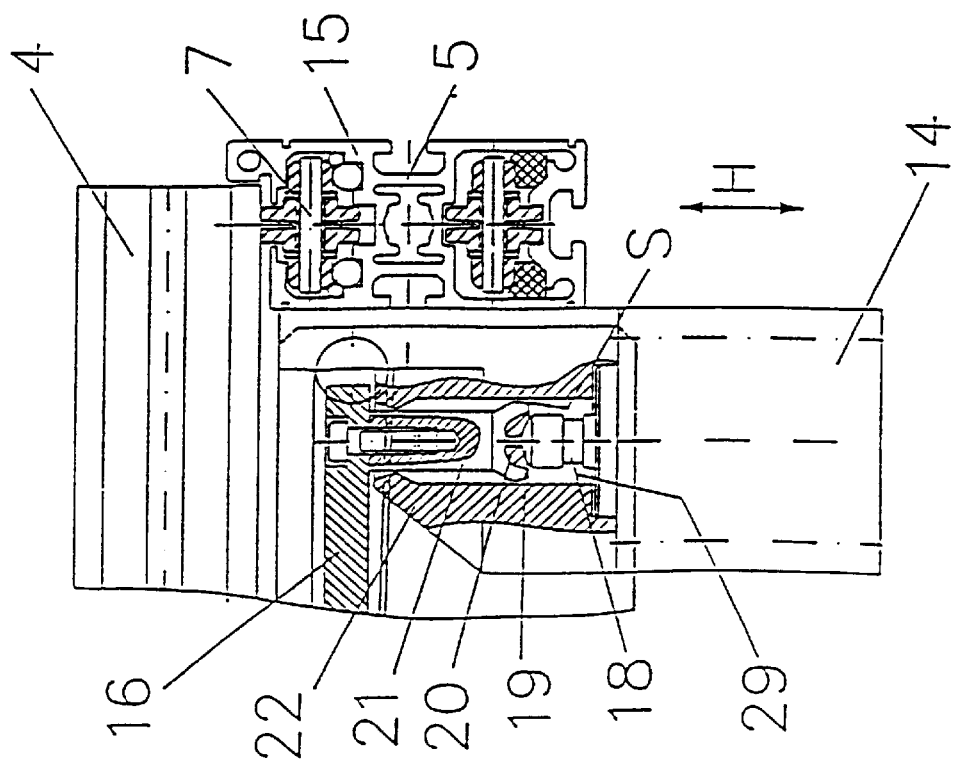
FIG. 4 is a detailed, cross-sectional view depicting the attachment of the linear drive unit to the conveyor element and depicted in the neutral position.

The coupling arrangement between conveyor elements 9 and linear drives 14 can be seen in FIGS. 4 and 5. FIG. 4 shows delivery device 8 in the lowered, neutral position and FIG. 5 shows it in the raised, delivery position. Each linear drive unit 14 is formed with a vertically reciprocal drive rod 18, which can be driven in the lifting and lowering direction H. Drive rod 18 has a spherical head on its free end, on which a ball receptacle 20 of a rod-shaped pushing element 21 rests. Spherical head 19 and ball receptacle 20 form a ball-and-socket joint. Ball receptacle 20 of pushing element 21 is held in a centered position on spherical head 19 by the downward force exerted thereupon by the conveyor elements 9, cross-wise supports 16 and longitudinal arms 17 during normal operation. In order to prevent ball receptacle 20 from sliding down off spherical head 19 because of the effects of external forces when out of the delivery position, ball receptacle 20 is surrounded by a bushing-shaped guide element 22, extending from each linear drive unit 14, while retaining a clearance S. Guide element 22 surrounds drive rod 18. In the event ball receptacle 20 moves laterally from the spherical head 19, the external radius of ball receptacle 20 will come into contact with the interior wall of the guide element 22, and thereby prevent ball receptacle 20 from slipping off spherical head 19.

To ensure a connection between drive rod 18 and pushing element 21 with conveyor elements 9 in the delivery position, a conical surface 23 is attached to pushing element 21 and partially surrounds ball receptacle 20. Conical surface 23 abuts a counterpressure surface 24, located at the upper end of guide element 22, when delivery device 8 is in the delivery position. Pushing element 21, which supports cross-wise support 16 at the end opposing ball receptacle 20, is held in the delivery position due to the abutting contact between conical surface 23 and counterpressure surface 24. Further, when in the delivery position, the abutting contact between conical surface 23 and counterpressure surface 24 provides resistance to torsional forces exerted on delivery device 8.

The above description is considered that of the preferred embodiments only. Modifications to the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the present invention in which an exclusive property or privilege is claimed are defined as follows:

1. A device for the delivery of a load from a first conveyor line to a second conveyor line, wherein the first conveyor line and the second conveyor line each consist of at least two conveyors placed in spaced apart, parallel relation, wherein the first conveyor line has a transport level, said device comprising:

at least one conveyor element positioned between the conveyors of the first conveyor line and the conveyors of the second conveyor line, said at least one conveyor element having a pair of ends; and at least one lifting assembly in operational connection with said at least one conveyor element, said at least one lifting assembly selectively lowering and lifting said at least one conveyor element between a neutral position wherein said at least one conveyor element is positioned below the transport level of the first conveyor line and a delivery position wherein said at least one conveyor element is positioned above the transport level of the first conveyor line, wherein said at least one lifting assembly has a plurality linear drive units, each linear drive unit of said plurality of linear drive units being connected to said at least one conveyor element by a coupler such that said at least one conveyor element is capable of movement between said neutral position and said delivery position and is held stationary in said delivery position, wherein said lifting assembly selectively lowers and lifts said at least one conveyor element at said ends, and wherein said at least one lifting assembly selectively lowers and lifts said at least one conveyor element adjacent to a conveyor of the second conveyor line.

2. The device according to claim 1, wherein said coupler further comprises a pushing element having an end having a conical surface, and a ball and socket joint attached to said end of said pushing element, and wherein each linear drive unit of said plurality of linear drive units further comprises:

a drive rod having an end attached to said ball and socket joint; and a guide element, said drive rod positioned within said guide element, said pushing element depending within said guide element, said guide element having a counterpressure surface, said guide element limiting the angular movement of said pushing element, said conical surface of said pushing element abutting said counterpressure surface when said lifting assembly is in said delivery position.

3. The device according to claim 2, wherein said pushing element is vertically reciprocal and has a cylindrical shape, wherein said conical surface of said pushing element has a ring shape and dimensioned to partially surround said ball and socket joint.

4. The device according to claim 1, wherein said at least one conveyor element is two conveyor elements and wherein said at least one lifting assembly is two lifting assemblies, said two conveyor elements positioned generally parallel and placed a preselected distance apart, each conveyor element of said two conveyor elements selectively lowered and lifted by a lifting assembly of said two lifting assemblies.

5. The device according to claim 3, wherein said at least one conveyor element is two conveyor elements and wherein said at least one lifting assembly is two lifting assemblies, said two conveyor elements positioned generally parallel and placed a preselected distance apart, each conveyor element of said two conveyor elements selectively lowered and lifted by a lifting assembly of said two lifting assemblies.

6. The device according to claim 1, wherein said at least one conveyor element is an endless circulating belt driven by deflection rollers.

7. The device according to claim 4, wherein each conveyor element of said two conveyor elements is an endless circulating belt driven by deflection rollers.

8. The device according to claim 6, wherein said plurality of linear drive units are pneumatic piston/cylinder assemblies.

9. The device according to claim 1, wherein said plurality of linear drive units are pneumatic piston/cylinder assemblies.

10. The device according to claim 7, wherein the first conveyor line has a pair of longitudinal supports and wherein each conveyor element of said two conveyor elements and each linear drive element of said plurality of linear drive elements is supported on a longitudinal support of the first conveyor line.

11. The device according to claim 2, wherein the first conveyor line has a pair of longitudinal supports and wherein each conveyor element of said two conveyor elements and each linear drive element of said plurality of linear drive elements is supported on a longitudinal support of the first conveyor line.

12. The device according to claim 3, wherein the first conveyor line has a pair of longitudinal supports and wherein each conveyor element of said two conveyor elements and each linear drive element of said plurality of linear drive elements is supported on a longitudinal support of the first conveyor line.

\* \* \* \* \*